US 11,481,516 B2

(12) United States Patent
Maneval et al.

(10) Patent No.: US 11,481,516 B2
(45) Date of Patent: Oct. 25, 2022

(54) METHOD FOR PREVENTING IMPERMISSIBLE ACCESS TO SOFTWARE APPLICATIONS IN FIELD DEVICES

(71) Applicant: Endress+Hauser Process Solutions AG, Reinach (CH)

(72) Inventors: Michael Maneval, Schopfheim (DE); Mario Wittig, Rheinfelden (DE)

(73) Assignee: ENDRESS+HAUSER PROCESS SOLUTIONS AG, Reinach (CH)

( * ) Notice: Subject to any disclaimer, the term of this patent is extended or adjusted under 35 U.S.C. 154(b) by 628 days.

(21) Appl. No.: 16/307,069

(22) PCT Filed: May 19, 2017

(86) PCT No.: PCT/EP2017/062069
§ 371 (c)(1),
(2) Date: Dec. 4, 2018

(87) PCT Pub. No.: WO2017/211569
PCT Pub. Date: Dec. 14, 2017

(65) Prior Publication Data
US 2019/0147179 A1    May 16, 2019

(30) Foreign Application Priority Data
Jun. 10, 2016    (DE) ............. 10 2016 110 723.9

(51) Int. Cl.
*G06F 21/62*    (2013.01)
*G05B 19/042*    (2006.01)
(Continued)

(52) U.S. Cl.
CPC ....... *G06F 21/629* (2013.01); *G05B 19/0425* (2013.01); *G06F 21/00* (2013.01);
(Continued)

(58) Field of Classification Search
CPC ........ G06F 21/629; G06F 21/00; G06F 21/57; G06F 8/65; H04L 63/102; H04L 67/12;
(Continued)

(56) References Cited

U.S. PATENT DOCUMENTS 9,806,963 B2 * 10/2017 Sanjeev ................. H04W 4/60
2004/0103165 A1 * 5/2004 Nixon .................... H04W 72/02
709/217
(Continued)

FOREIGN PATENT DOCUMENTS

CN    104683981 A    6/2015
DE    10248100 A1    4/2004
(Continued)

OTHER PUBLICATIONS

Search Report for German Patent Application No. 10 2016 110 723.9, German Patent Office, dated May 12, 2017, 6 pp.
(Continued)

*Primary Examiner* — Robert B Leung
*Assistant Examiner* — Bruce S Ashley
(74) *Attorney, Agent, or Firm* — Mark A. Logan; Endress+Hauser (USA) Holding Inc.

(57) ABSTRACT

The invention includes a method and a communication network for preventing impermissible access to software applications implemented in field devices, wherein the field devices are integrated in a communication network of automation technology and wherein each software application exchanges information within the communication network via at least one communication interface. The method includes registering currently activated safety functions of each of the communication interfaces; registering all activatable safety functions of each communication interface; ascertaining at least one shared safety function, which is activatable in each of the communication interfaces; dis-
(Continued)

playing the shared safety functions and selecting at least one displayed, shared safety function; and reconfiguring each of the communication interfaces, wherein currently set safety functions are replaced by the at least one selected, shared safety function, and when no shared safety function was ascertained, each of the communication interfaces is so reconfigured that no safety function is activated.

10 Claims, 2 Drawing Sheets

(51) Int. Cl.
| | | |
|---|---|---|
| *H04L 9/40* | (2022.01) | |
| *G06F 21/00* | (2013.01) | |
| *H04L 67/12* | (2022.01) | |
| *G06F 21/57* | (2013.01) | |
| *H04W 12/08* | (2021.01) | |
| *G06F 8/65* | (2018.01) | |

(52) U.S. Cl.
CPC .............. *G06F 21/57* (2013.01); *H04L 63/10* (2013.01); *H04L 63/102* (2013.01); *H04L 67/12* (2013.01); *H04W 12/08* (2013.01); *G05B 2219/24024* (2013.01); *G05B 2219/2642* (2013.01); *G06F 8/65* (2013.01); *H04L 63/168* (2013.01)

(58) Field of Classification Search
CPC ...... H04L 63/10; H04L 63/168; H04W 12/08; G05B 19/0425; G05B 2219/24024; G05B 2219/2642
See application file for complete search history.

(56) References Cited

U.S. PATENT DOCUMENTS

| | | | | |
|---|---|---|---|---|
| 2009/0271709 | A1* | 10/2009 | Jin | H04L 63/20 |
| | | | | 715/739 |
| 2010/0153736 | A1* | 6/2010 | Kilian | G05B 19/4185 |
| | | | | 713/185 |
| 2012/0066486 | A1* | 3/2012 | Hodge | G06F 15/177 |
| | | | | 713/320 |
| 2013/0179554 | A1* | 7/2013 | Zhao | H04L 67/32 |
| | | | | 709/223 |
| 2013/0305062 | A1* | 11/2013 | Falk | H04L 63/10 |
| | | | | 713/193 |
| 2015/0121507 | A1* | 4/2015 | Haija | H04L 9/32 |
| | | | | 726/17 |
| 2015/0150073 | A1 | 5/2015 | Bhalerao et al. | |
| 2015/0207793 | A1* | 7/2015 | Mohamed | H04L 63/168 |
| | | | | 726/6 |
| 2016/0330222 | A1* | 11/2016 | Brandt | G05B 19/4185 |
| 2017/0041793 | A1* | 2/2017 | Lee | H04L 63/10 |
| 2017/0126841 | A1* | 5/2017 | Bliss | G06F 3/0481 |

FOREIGN PATENT DOCUMENTS

| | | |
|---|---|---|
| DE | 102011002706 A1 | 7/2012 |
| DE | 202013103586 U1 | 11/2014 |
| EP | 2274874 B1 | 1/2011 |
| WO | 9854644 A1 | 12/1998 |

OTHER PUBLICATIONS

International Search Report for Patent Application No. PCT/EP2017/062069, WIPO, dated Jul. 19, 2017, 12 pp.
Fu, Z, Huang, H., Wu, T., Wu, S. F., Gong, F., Xu, C., Baldine, I, ISCP: Design and Implementation of an Inter-Domain Security Management Agent (SMA) Coordination Protocol, 2000, 14 pp. (566-578).

* cited by examiner

METHOD FOR PREVENTING IMPERMISSIBLE ACCESS TO SOFTWARE APPLICATIONS IN FIELD DEVICES

CROSS-REFERENCE TO RELATED APPLICATIONS

The present application is related to and claims the priority benefit of German Patent Application No. 10 2016 110 723.9, filed on Jun. 10, 2016 and International Patent Application No. PCT/EP2017/062069 filed on May 19, 2017, the entire contents of which are incorporated herein by reference.

TECHNICAL FIELD

The invention relates to a method and to communication network automation technology for preventing impermissible access to software applications implemented in field devices, wherein the field devices are integrated in the communication network and wherein each software application exchanges information within the communication network via at least one communication interface.

BACKGROUND

Known in the state of the art are field devices, which are used in industrial plants. In process automation technology, same as in manufacturing automation technology, field devices are often applied. Referred to as field devices are, in principle, all devices, which are applied near to the process and which deliver, or process, process relevant information. Thus, field devices are used for registering and/or influencing process variables. Serving for registering process variables are measuring devices, or sensors. These are used, for example, for pressure- and temperature measurement, conductivity measurement, flow measurement, pH measuring, fill level measurement, etc. and register the corresponding process variables, pressure, temperature, conductivity, pH-value, fill level, flow, etc. Used for influencing process variables are actuators. These are, for example, pumps or valves, which can influence the flow of a medium in a tube or the fill level in a container. Besides the above measuring devices and actuators, referred to as field devices are also remote I/Os, radio adapters, or generally, devices, which are arranged at the field level.

A large number of such field devices are produced and sold by the Endress+Hauser group of companies.

In modern industrial plants, field devices are, as a rule, connected via communication networks, such as, for example, fieldbusses (Profibus®, Foundation® Fieldbus, HART®, etc.) with superordinated units. Normally, the superordinated units are control systems, or control units, such as, for example, a PLC (programmable logic controller). The superordinated units serve, among other things, for process control, process visualizing, process monitoring as well as for start-up of the field devices. The measured values registered by the field devices, especially in the form of sensors, are transmitted via the utilized bus system to a superordinated unit (in given cases, to a number of superordinated units). Along with that, also data transmission from the superordinated unit via the bus system to the field devices is required, especially for the configuring and parametering of field devices, as well as for the operation of actuators.

Software applications are implemented in many field devices. The software applications serve, for example, to condition measured values, to control the communication of the field device via the fieldbus and/or to allow a user to interact with the field device. The in- and output of information received from a communication network or sent to such occurs via communication interfaces of a particular software application. If two or more software applications are present in a field device, then the software applications can also exchange information within the field device via their communication interfaces.

The securing of such communication interfaces is of great importance, in order to avoid misuse of the information and/or to avoid an impermissible, external accessing of a software application. Under the label, information security, fall a large number of different safety concepts, which are divided into different protection goals, especially into the protection goals of confidentiality, integrity, availability and authenticity. These individual protection goals are explained in greater detail as follows:

The protection goal, confidentiality, establishes that information is provided only for a certain group of receivers. Forwarding and publication, as well as unauthorized revealing, of the information is not desired. This protection goal is achieved, for instance, by safety functions in the form of encryption methods.

The protection goal, integrity, describes the prevention of an unauthorized modification of information. The information is not allowed to be changed and all changes must be traceable. This can be implemented technically, for example, by checksums, which can be transmitted with information and with which it can be detected, whether the information was changed.

A further example of a protection function of the protection goal, integrity, is output escaping. In such case, in string values to be transmitted, critical reference characters, for example, "<" or "&", are replaced by the HTML entities for these reference characters, in this example, "<" for "<", and "&" for "&". The information manipulated by these methods must, however, be correctly interpreted by the receiver, in order to avoid error.

The entering of such critical reference character can lead to execution of code in a software application that possibly permits accessing of sensitive data. The reference character "<", for example, introduces a command in HTML. Such an entering of critical reference characters for the impermissible accessing of a software application is called cross site scripting (also: XSS).

The protection goal, availability, serves for preventing system stoppages. The accessing of information within an agreed-upon time frame must be assured.

The protection goal, authenticity, refers to the properties of truth, verifiability and trustworthiness information.

Occasionally, the software applications implemented in the field devices can have for their communication interfaces a large number of settable safety functions, based on safety- and/or functional characteristics of one or more of the protection goals. The various, set safety functions function, however, only sensibly, when in the transmitting communication interface and in the receiving communication interface the same safety function is activated. If the transmitting communication interface allows, for example, the activating of a safety function according to the protection goal, integrity, such as, for example, providing an accompanying checksum, then the receiving communication interface must have the same safety function activated, in order to be able to validate the checksum of the transmitted information. In the case of another activated safety function, such as, for example, output escaping or the encrypting of information, it is possible that the content of the information will be incorrectly interpreted by the receiving communication interface, in case the same safety function is not activated therein.

SUMMARY

Starting from the above described problems, an object of the invention is to provide a method and a communication network, which in simple manner protect software applications implemented in field devices systematically against impermissible accessing.

The object is achieved by a method for preventing impermissible access to software applications implemented in field devices, wherein the field devices are integrated in a communication network of automation technology and wherein each software application exchanges information within the communication network via at least one communication interface, comprising:
  registering currently activated, safety- and/or functional characteristic based, safety functions of each of the communication interfaces of the software applications;
  registering all activatable safety functions of each communication interface;
  ascertaining at least one shared safety function, which is activatable in each of the communication interfaces;
  displaying the at least one shared safety function and selecting at least one displayed, shared safety function; and
  reconfiguring each of the communication interfaces, wherein currently set safety functions are replaced by the at least one selected, shared safety function, and wherein for the case, in which no shared safety function was ascertained, each of the communication interfaces is so reconfigured that no safety function is activated.

The method of the invention offers the significant advantage that safety functions can only be activated when they are activatable on all communication interfaces. A safety function is thus activated systematically for all communication interfaces. In this way, the entire communication network can be secured against unpermitted external access. In such case, the method works on the basic principle that either the same safety functions are activated on all communication interfaces or on no communication interface is a safety function activated. This is especially advantageous when safety functions based on safety- and/or functional characteristics of the protection goal, integrity, are activated, safety functions which purposely manipulate the transmitted information, for example, by adding a checksum or by output escaping of critical reference characters, for example, the TAG of a field device, which is exchanged between the software applications.

Field devices, which are used in connection with the method of the invention, are named, by way of example, in the introductory part of the description.

A preferred embodiment of the method of the invention includes, supplementally, the following method step:
  evaluating the communication network, wherein, in the case of a negative evaluation, the method is repeated from the step of selecting one or more shared safety functions.

By this method step, a loss of information in the case of a defective reconfiguration of the individual communication interfaces can be prevented. For example, the error can occur that a certain shared safety function could not be activated in the case of all communication interfaces. In this case, after the reconfiguration, these communication interfaces are burdened with safety risks. Likewise, an incorrect interpretation of the received information can occur.

In a preferred further development of the method of the invention, it is provided that a modeling and visualizing of a flow of information of the mutually communicating software applications occurs, wherein the pertinent communication interfaces and their activatable safety functions are illustrated.

The visualizing occurs preferably in a stationary superordinated unit, for example, in a plant asset management (PAM) system, which accesses the communication network from a central position. It can be provided to visualize the individual communication interfaces and their activatable safety functions in tabular form, or to represent the individual communication interfaces and their activatable safety functions in a virtual plant plan. It can likewise be provided that the visualizing occurs on a mobile unit, which is connected to the communication network. The mobile unit can be a handheld servicing device or a laptop, or a mobile end device, such as a tablet or a smart phone.

In a preferred further development of the method of the invention, those settable safety functions in the visualization are grayed out, which do not belong to the shared safety functions activatable in each of the interfaces. For the user, it is, on the one hand, made evident, which safety functions are activatable in all communication interfaces, and, on the other hand, which additional safety functions are theoretically activatable in the pertinent communication interfaces of the individual software applications.

Furthermore, an advantageous embodiment of the method of the invention provides that the selection of at least one shared safety function occurs via the visualizing of the flow of information, in order to facilitate interaction by the user.

In an advantageous, further development of the method of the invention, it is provided that the method is executed after addition or removal of a software application.

In an especially preferred variant of the method of the invention, the method is executed after each updating of any one of the software applications.

In both cases, it is thus assured, at any time, that the protection functions remain consistent after a changing or updating of a software application. The correct interpretation of the information exchanged between the communication interfaces of the particular software applications is thereby assured at any time.

Furthermore, the object is achieved by a communication network for performing the method of the invention.

In an embodiment of the communication network of the invention, it is provided that the communication network is a wireless network. In principle, any conventional protocol of a wireless network, for example, WLAN, Bluetooth®, ZigBee®, RFID, NFC, etc. or of a wireless fieldbus protocol, such as, for example, wireless HART® can be used.

Another embodiment of the communication network of the invention provides that the communication network is a wired network. In principle, any conventional protocol of a wired network, especially a fieldbus network of automation technology, such as, for example, Foundation Fieldbus®, Profibus®, Profinet®, HART®, ModBus®, Industrial Ethernet, etc., can be applied.

BRIEF DESCRIPTION OF THE DRAWING

The invention will now be explained in greater detail based on the appended drawing, the figures of which show as follows.

DETAILED DESCRIPTION

Figure 1:
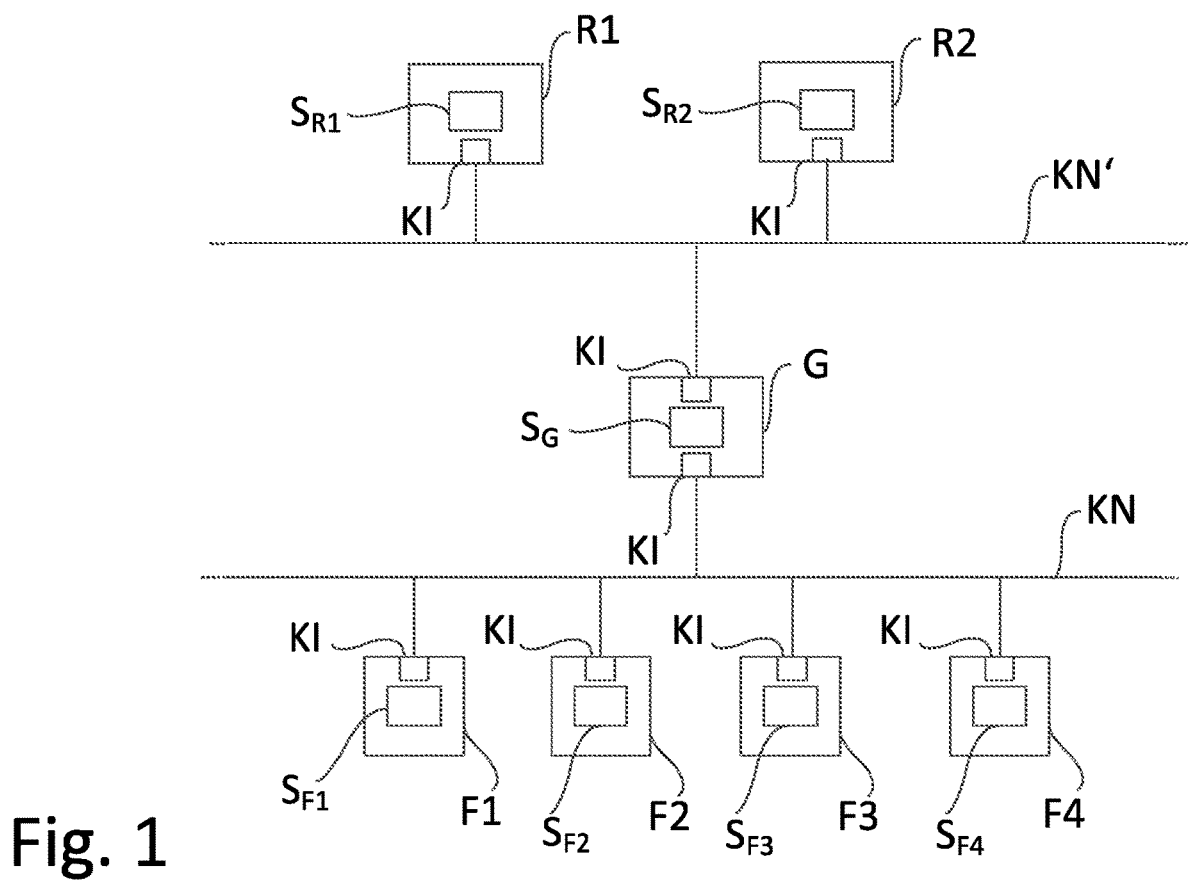
FIG. 1 shows an embodiment of the communication network of the invention.

FIG. 1 shows an embodiment of the communication network KN, KN' of the invention in greater detail. Connected to a communication network KN' are a plurality of computer units (workstations) R1, R2. Computer unit R1 serves here as superordinated unit (control system, or control unit) for, among other purposes, process visualizing, process monitoring and for engineering, as well as for servicing and monitoring of field devices. Computer unit R2 serves here as plant asset management system (PAM). The communication network KN' works e.g. according to the Profibus DP standard or according to the HSE (High Speed Ethernet) standard of the Foundation Fieldbus. Via a gateway G, which is also referred to as a linking device, field controller or also as a segment coupler, the communication network KN' is connected with an additional section of a communication network KN. Connected to this communication network KN is a plurality of field devices F1, F2, F3, F4. The field devices F1, F2, F3, F4 can include both sensors and actuators. The communication network KN is embodied, for example, as a wired fieldbus, which works according to one of the known fieldbus standards, such as, for example, Profibus®, Foundation® Fieldbus or HART®. As explained in the introductory part of the description, also the gateway G falls under the concept of a field device.

Each of the field devices F1, F2, F3, F4, G has at least one software application $S_{F1}$, $S_{F2}$, $S_{F3}$, $S_{F4}$, $S_G$. The software applications $S_{F1}$, $S_{F2}$, $S_{F3}$, $S_{F4}$, $S_G$ exchange information with one another via communication interfaces. The software applications $S_{F2}$, $S_{F3}$, $S_{F4}$, $S_G$ can, in such case, have either two separate communication interfaces KI, wherein one of the communication interfaces KI serves for transmitting information and wherein the other communication interface KI serves for receiving information. It can, however, also be provided that one communication interface KI can both transmit information, as well as also receive information.

In addition to the field devices F1, F2, F3, F4, G, also the computer units R1, R2 can have software applications $S_{R1}$, $S_{R2}$ with corresponding communication interfaces KI.

The information can, in such case, be sent via the communication network KN, KN'. It can also be provided that at least two or more software applications $S_{F1}$, $S_{F2}$, $S_{F3}$, $S_{F4}$, $S_G$ are implemented in a field device F1, F2, F3, F4, G. In this case, the information can also be transmitted within a field device F1, F2, F3, F4, G.

One of the two computer units R1, R2 registers currently activated safety functions of each of the communication interfaces KI of the software applications $S_{F1}$, $S_{F2}$, $S_{F3}$, $S_{F4}$, $S_G$ of the field devices F1, F2, F3, F4, G. Furthermore, the computer unit R1, R2 registers supplementally all activatable safety levels of each of the communication interfaces KI. It can, in such case, be provided that the computer unit R1, R2 must authenticate for each of the software applications $S_{F1}$, $S_{F2}$, $S_{F3}$, $S_{F4}$, $S_G$, in order to obtain access to the currently set safety levels and the supplementally activatable safety levels of each of the communication interfaces.

The computer unit R1, R2 ascertains from the registered data at least one safety function, which is available in each of the communication interfaces KI. This ascertained shared safety function or the ascertained plurality of shared safety functions are displayed to the user for selection on the computing unit R1, R2.

Preferably, the computer unit models the flow of information of the software applications $S_{F1}$, $S_{F2}$, $S_{F3}$, $S_{F4}$, $S_G$ communicating with one another in the communication network. In this way, it can be displayed, which software applications $S_{F1}$, $S_{F2}$, $S_{F3}$, $S_{F4}$, $S_G$ actually communicate actively, which software applications $S_{F1}$, $S_{F2}$, $S_{F3}$, $S_{F4}$, $S_G$ do not participate in the communication, via which communication interfaces KI the software applications $S_{F1}$, $S_{F2}$, $S_{F3}$, $S_{F4}$, $S_G$ communicate and which software applications $S_{F1}$, $S_{F2}$, $S_{F3}$, $S_{F4}$, $S_G$ communicate with which software applications $S_{F1}$, $S_{F2}$, $S_{F3}$, $S_{F4}$, $S_G$.

The visualizing can occur in tabular form; alternatively, it can, however, also be shown in a virtual plant plan. Preferably, for a communication interface KI, all safety functions activatable in such communication interface KI are displayed. In such case, those safety functions are grayed out or not presented for selection, which are not contained in the set of ascertained, shared safety functions.

After selection of one or more shared safety functions, the computing unit R1, R2 reconfigures all communication interfaces KI of each of the software applications $S_{F1}$, $S_{F2}$, $S_{F3}$, $S_{F4}$, $S_G$. If no shared safety function could be ascertained, then the individual communication interfaces KI are in such a manner reconfigured that a safety function is activated in none of the communication interfaces KI. The is especially necessary when a preconfigured new field device F1, F2, F3, F4, G is added to the communication network KN, KN', or a new software is employed in a field device F1, F2, F3, F4, G. In such case, safety functions already activated by default in the new communication interfaces KI, but not in all communication interfaces KI of the remaining software applications $S_{F1}$, $S_{F2}$, $S_{F3}$, $S_{F4}$, $S_G$, could lead to incorrect interpretations of exchanged information.

In an additional method step, it can be provided to evaluate the communication network KN, KN' after the reconfiguration of all communication interfaces KI. In such case, all communication interfaces KI are checked concerning whether the shared safety function was correctly activated. Furthermore, it is checked whether the flow of information between the individual software components $S_{F1}$, $S_{F2}$, $S_{F3}$, $S_{F4}$, $S_G$ has changed. If the evaluation is negative, the method of the invention is repeated from the step of selecting one or more shared, activatable software functions.

Alternatively to the computer unit R1, R2, also a mobile servicing device (not shown in FIG. 1) can be used for registering the safety levels of each of the communication interfaces KI, for ascertaining a shared safety level, for selecting the safety level, for reconfiguring each of the safety interfaces KI and for visualizing. The mobile unit can be a handheld servicing device or a laptop, or, however, also a mobile end device such as a tablet or a smart phone.

Figure 2:
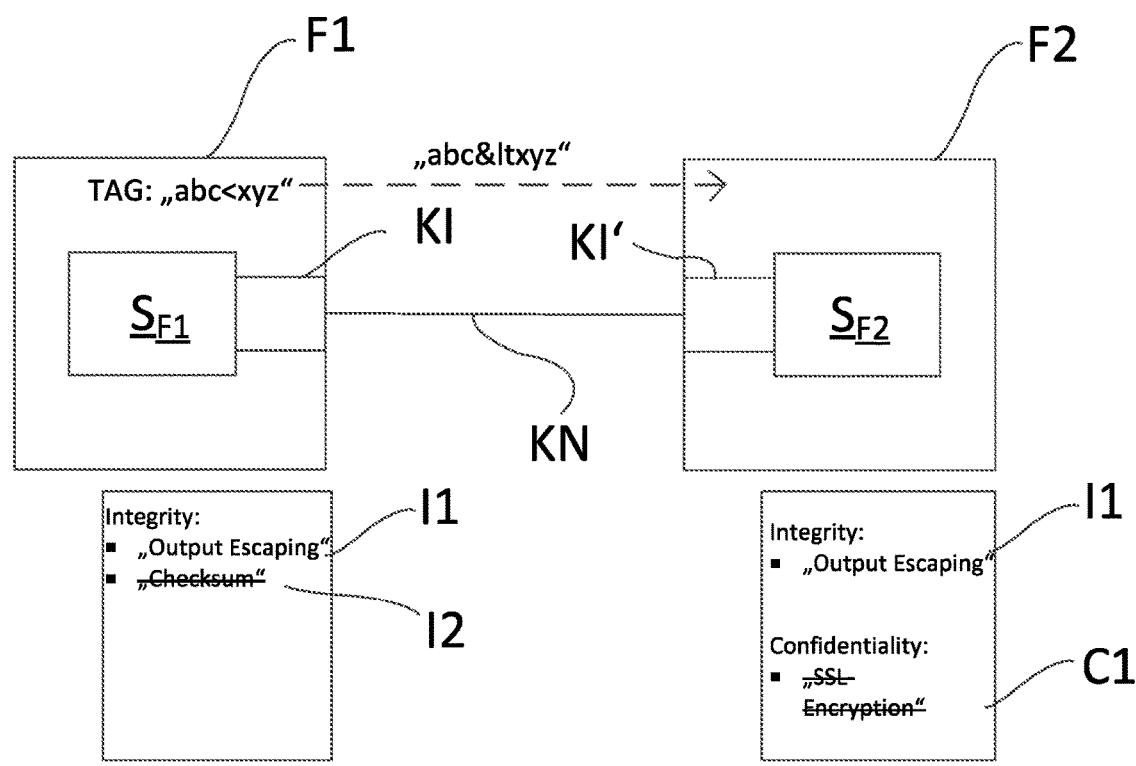
FIG. 2 shows an embodiment of the method of the invention based on the safety goal, integrity.

FIG. 2 shows an embodiment of the method of the invention based on the safety goal, integrity. Provided by way of example for the communication are the software components $S_{F1}$ and $S_{F2}$, which are implemented in field devices F1, or F2.

After performing the registering of the currently activated safety functions of the communication interfaces KI, KI' and the registering of all activatable safety functions of the communication interfaces KI, KI', the user is shown on a computer unit R1, R2 the registered shared safety functions I1. In this example, there is one, the safety function I1, output escaping, based on the protection goal, integrity, which is available on all communication interfaces KI, KI'.

Besides the safety function I1, output escaping, the communication interface KI of the software application $S_{F1}$ enables the adding of a checksum to the sent information. This safety function I2 is based likewise on the protection goal, integrity.

Besides the safety function I1, output escaping, the communication interface of the software application $S_{F2}$ enables the encrypting of the sent information by means of SSL. This safety function C1 is based on the protection goal, confidentiality.

This additional safety functions I2, C1 are displayed to the user, but they are grayed out or shown in other manner not selectable by the user.

Since the user has selected the shared safety function I1, output escaping, the computer unit R1, R2 reconfigures the pertinent communication interfaces KI, KI' of the software applications SF1, SF2. Furthermore, the communication network KN is evaluated after transpired reconfiguration of the communication interfaces KI, KI'.

A communication between the software applications $S_{F1}$, $S_{F2}$ will now be described by way of example in the following:

The software application $S_{F2}$ sends to the software application $S_{F1}$ a request for transmission of the TAG of the field device F1, in which the software application $S_{F1}$ is implemented. The software application $S_{F1}$ identifies the TAG of the field device F1, "abc<xyz". Since the reference character "<" is a safety critical reference character, the communication interface KI of the software application SF1 replaces this before the transmission according to the method of output escaping, for example, with the HTML entity "<" corresponding to the reference character "<". Transmitted as information is thus the TAG "abc<xyz".

The communication interface KI' of the software application $S_{F2}$ receives this transmitted information. Since, also in this communication interface, the safety function I1, output escaping, is activated, the communication interface KI detects the alteration of the TAG and converts the TAG back to its original form before forwarding it to the software application $S_{F2}$ as the original character sequence "abc<xyz".

Now, based on the example of an embodiment shown in FIG. 2, it will be illustrated, why the safety functions have to be activatable on all communication interfaces: In this example, the communication interface KI' of the software application $S_{F2}$ permits the encryption of data by means of SSL. If this safety function is activated, then the information transmitted by this communication interface KI' cannot be decoded by the communication interface KI of the software application $S_{F1}$.

Of course, the method can be used for any type and number of software applications in field devices F1, F2, F3, F4, G in a communication network KN, KN' and is not limited to the examples, safety functions I1, I2, C1 and protection goals used in this embodiment.

The invention claimed is:

1. A method for preventing impermissible access to software applications implemented in field devices, wherein the field devices are integrated in a communication network of automation technology and wherein each software application exchanges information within the communication network via at least one communication interface, the method comprising:

registering safety- and/or functional characteristic based safety functions that are currently activated in each of the communication interfaces of the software applications;

registering all safety functions that are activatable in each communication interface;

when at least one activatable safety function is present,
ascertaining at least one shared safety function that is activatable in each of the communication interfaces;
displaying the at least one shared safety function and selecting at least one displayed, shared safety function; and
reconfiguring each of the communication interfaces and replacing currently activated safety functions in the communication interfaces with the at least one selected, shared safety function; and when no shared safety function is present,
reconfiguring each of the communication interfaces so that no safety function is activated in the respective communication interface.

2. The method as claimed in claim 1, further comprising:
evaluating the communication network;
when the evaluation is negative and at least one activatable safety function is present,
displaying the at least one shared safety function and selecting at least one displayed, shared safety function; and
reconfiguring each of the communication interfaces, wherein currently set safety functions are replaced by the at least one selected, shared safety function; and
when the evaluation is negative and no shared safety function is present,
reconfiguring each of the communication interfaces so that no safety function is activated.

3. The method as claimed in claim 1, further comprising:
modeling and visualizing a flow of information of mutually communicating software applications, wherein pertinent communication interfaces and their activatable safety functions are illustrated.

4. The method as claimed in claim 3, further comprising:
graying out the activatable safety functions in the visualization that do not belong to the shared safety functions settable in each of the communication interfaces.

5. The method as claimed in claim 3, wherein the selecting of at least one shared safety function occurs via the visualizing of the flow of information.

6. The method as claimed in claim 1, further comprising:
executing the method after an addition or removal of a software application.

7. The method as claimed in claim 1, further comprising:
executing the method after each updating of any one of the software applications.

8. A communication network, comprising:
a computer unit including a control software;
a first field device including a first software application having a first communication interface; and
a second field device including a second software application having a second communication interface,
wherein the control software is configured to:
register safety functions that are currently activated in the first communication interface and in the second communication interface;
register all safety functions that are activatable in the first communication interface and in the second communication interface;

when at least one activatable safety function is present in the first communication interface and in the second communication interface,
ascertain at least one shared safety function that is activatable in the first communication interface and in the second communication interface;
display the at least one shared safety function;
select at least one displayed, shared safety function; and
reconfigure the first communication interface and the second communication interface and replace currently activated safety functions in the first communication interface and in the second communication interface by the at least one selected, shared safety function; and when no shared safety function is present,
reconfigure the first communication interface and the second communication interface so that no safety function is activated in the first communication interface and in the second communication interface.

9. The communication network as claimed in claim 8, wherein the communication network is a wireless network.

10. The communication network as claimed in claim 8, wherein the communication network is a wired network based on a fieldbus protocol of automation technology.

* * * * *